United States Patent
Yamada

(10) Patent No.: US 10,475,476 B2
(45) Date of Patent: Nov. 12, 2019

(54) FLEXURE OF HARD DISK DRIVE

(71) Applicant: NHK SPRING CO., LTD., Yokohama-shi, Kanagawa (JP)

(72) Inventor: Yukie Yamada, Yokohama (JP)

(73) Assignee: NHK SPRING CO., LTD., Tokyo (JP)

(*) Notice: Subject to any disclaimer, the term of this patent is extended or adjusted under 35 U.S.C. 154(b) by 0 days.

(21) Appl. No.: 16/136,938

(22) Filed: Sep. 20, 2018

(65) Prior Publication Data
US 2019/0096434 A1    Mar. 28, 2019

(30) Foreign Application Priority Data

Sep. 22, 2017  (JP) ................ 2017-183048

(51) Int. Cl.
G11B 5/48    (2006.01)
(52) U.S. Cl.
CPC ............ G11B 5/4846 (2013.01); G11B 5/484 (2013.01); G11B 5/4833 (2013.01)
(58) Field of Classification Search
CPC ........ G11B 5/48; G11B 5/4846; G11B 5/4853; G11B 5/4826; G11B 5/4833
USPC .............................................. 360/245–245.9
See application file for complete search history.

(56) References Cited

U.S. PATENT DOCUMENTS

| | | | |
|---|---|---|---|
| 5,892,637 A | 4/1999 | Brooks et al. | |
| 7,129,418 B2 * | 10/2006 | Aonuma | H05K 3/243 174/255 |
| 8,064,168 B1 * | 11/2011 | Zhang | G11B 5/4833 360/245.4 |
| 2004/0245619 A1 * | 12/2004 | Takeuchi | H01L 23/49827 257/688 |
| 2005/0122627 A1 * | 6/2005 | Kanagawa | G11B 5/486 360/245.9 |
| 2011/0141624 A1 * | 6/2011 | Fuchino | G11B 5/4833 360/244.2 |
| 2012/0134047 A1 * | 5/2012 | Kikuchi | G11B 5/4853 360/99.08 |
| 2015/0027752 A1 * | 1/2015 | Takakura | H05K 1/118 174/251 |
| 2016/0012838 A1 * | 1/2016 | Arai | G11B 5/4846 360/245.9 |
| 2016/0012839 A1 * | 1/2016 | Arai | G11B 5/4826 360/245.9 |
| 2016/0071533 A1 * | 3/2016 | Kawao | G11B 21/16 360/245.9 |
| 2017/0179005 A1 * | 6/2017 | Yamada | H01L 21/4825 |

* cited by examiner

*Primary Examiner* — Allen T Cao
(74) *Attorney, Agent, or Firm* — Holtz, Holtz & Volek PC

(57) ABSTRACT

A flexure of a hard disk drive includes a metal base, and a conductive member formed on the metal base. The conductive member includes an insulating layer and a conductive layer. The insulating layer has a flat portion and an elevated portion projected from the flat portion. The conductive layer has a connecting terminal formed along the side surface.

7 Claims, 8 Drawing Sheets

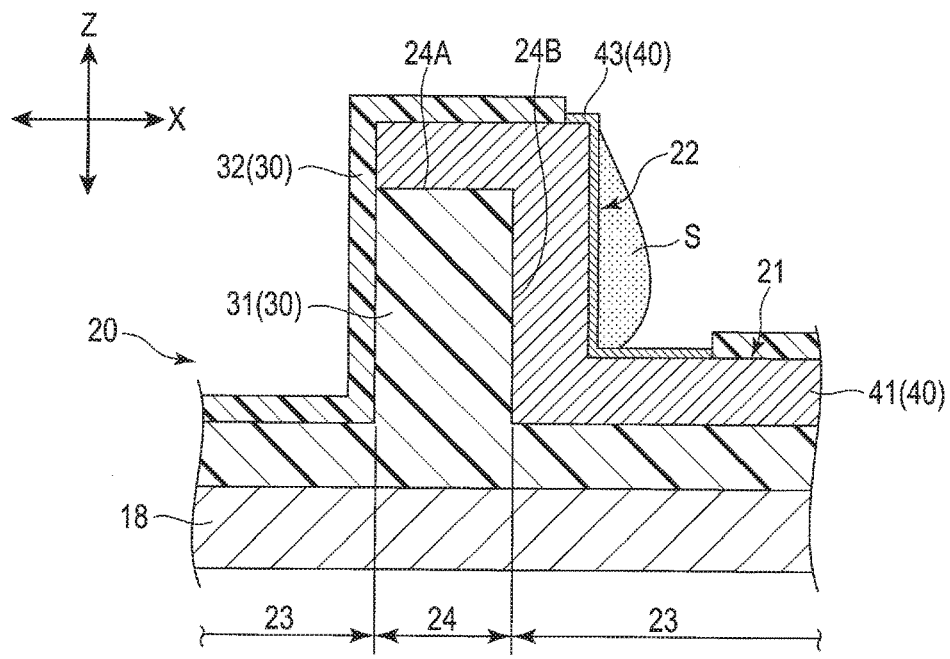
F I G. 5
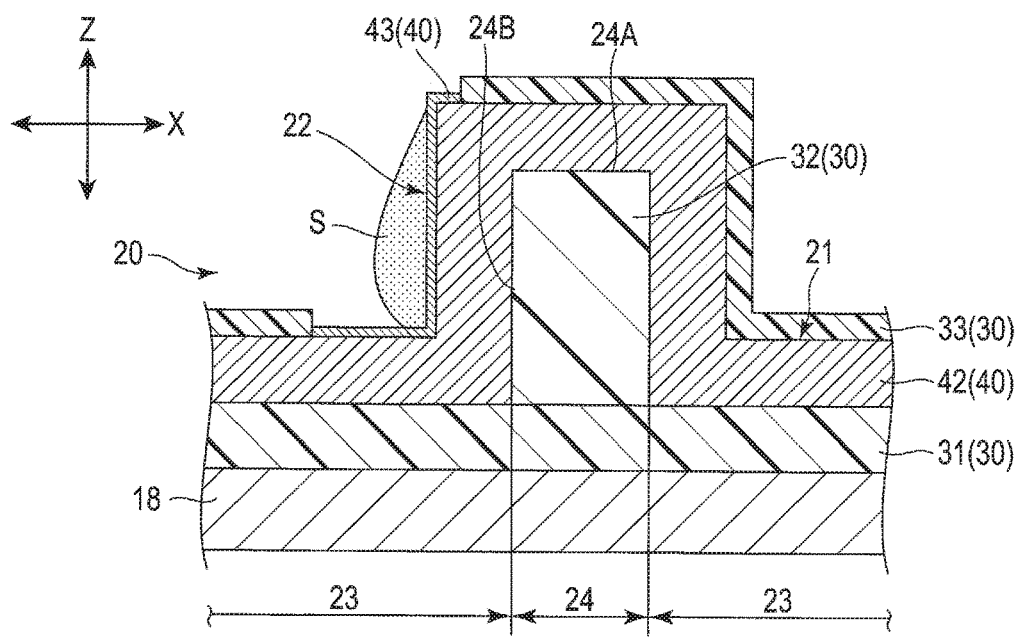
F I G. 6

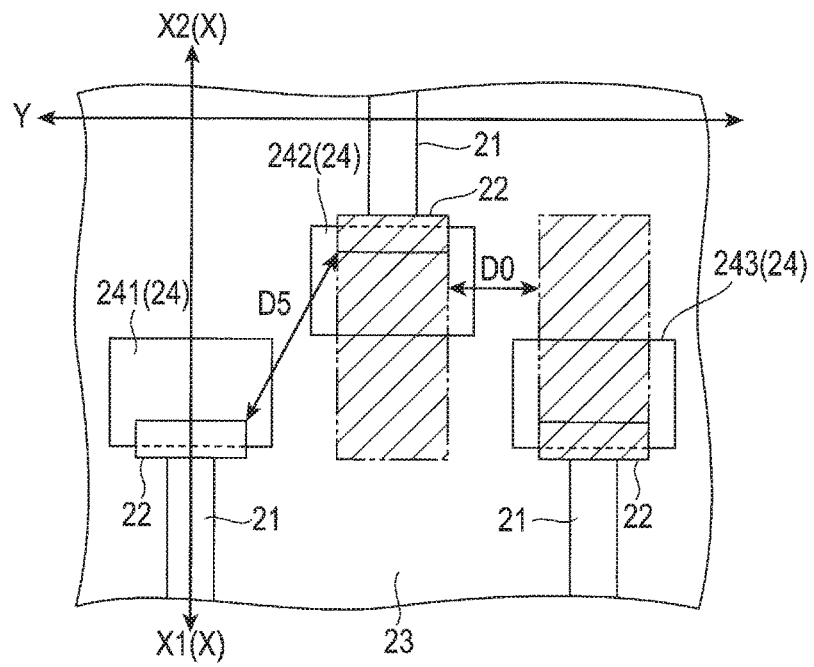
F I G. 11
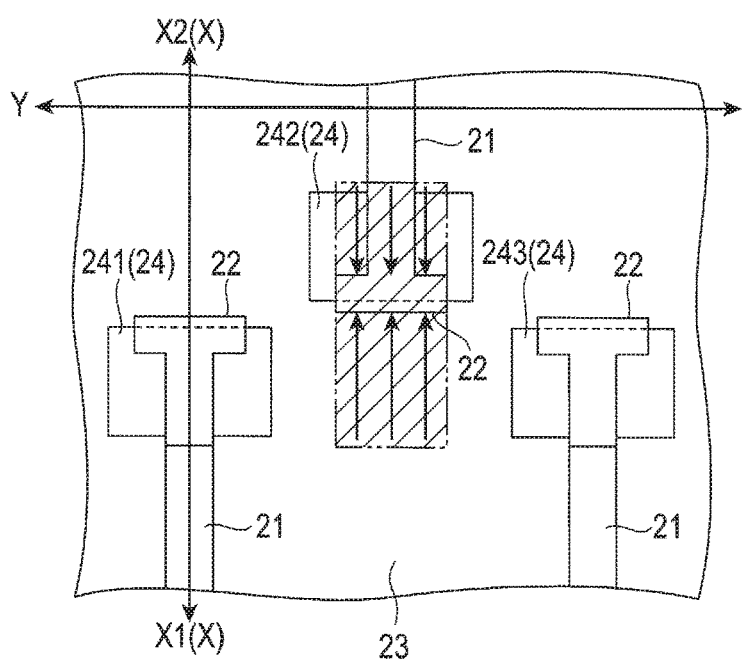
F I G. 12

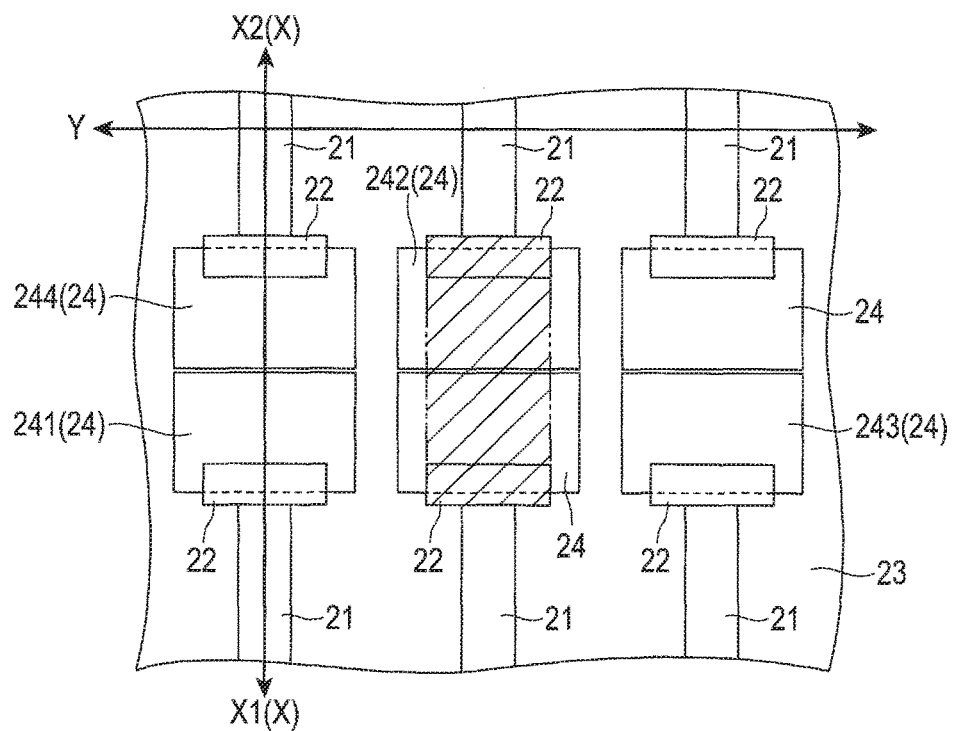
F I G. 13
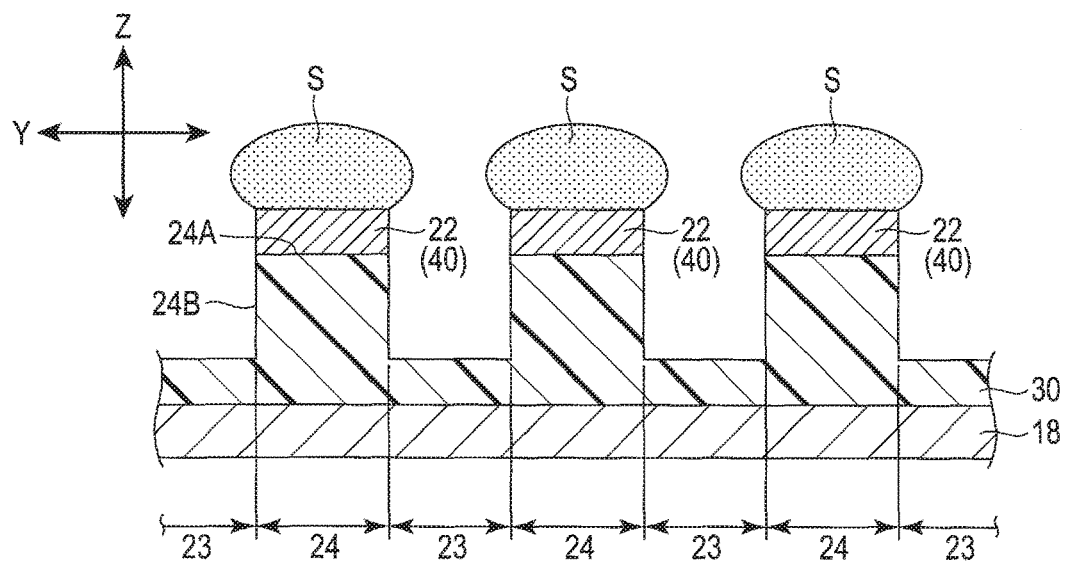
F I G. 14

FLEXURE OF HARD DISK DRIVE

CROSS-REFERENCE TO RELATED APPLICATIONS

This application is based upon and claims the benefit of priority from prior Japanese Patent Application No. 2017-183048, filed Sep. 22, 2017, the entire contents of which are incorporated herein by reference.

BACKGROUND OF THE INVENTION

1. Field of the Invention

The present invention relates to, for example, a flexure of a hard disk drive comprising a conductive member formed of a plurality of layers.

2. Description of the Related Art

The flexure of the hard disk drive comprises a metal base formed of a thin stainless steel plate and a conductive member formed on the metal base, and a slider with a magnetic head is mounted on an elastically deformable gimbal portion. In addition to the slider, a component such as a microactuator which rotates the slider in the sway direction is also mounted on the gimbal portion. As the flexure becomes multifunctional, the number of components mounted on the gimbal portion increases.

The conductive member of the flexure comprises a plurality of conductors which electrically connect the components mounted on the gimbal portion and external circuits provided in a carriage. Connecting terminals formed at both ends of the conductors are connected to the components mounted on the gimbal portion and the external circuits of the carriage via solder, silver paste or the like.

As the number of components mounted on the gimbal portion increases, the number of corresponding conductors increases, and the adjacent conductors or connecting terminals will be located close to each other. In the case of conductors, the distance between the conductors can be increased by reducing the thickness of the conductors. On the other hand, the area of connecting terminals needs to be large enough to ensure connection reliability, and the width of the connecting terminals needs to be increased. However, if the distance between the connecting terminals is short, solder or the like may flow into the adjacent connecting terminals, and the connecting terminals may short out.

For example, U.S. Pat. No. 5,892,637 A discloses that the ends of conductive leads are mechanically bent and raised up to be connected to slider pads in a multi-piece integrated suspension assembly. In a flexure having a limited space, to reduce the area of connecting terminals in a plan view, the connecting terminals may be raised up.

However, such machine processing is troublesome in the minute gimbal portion. If the bend portions are formed with low from accuracy, connection trouble may occur between the bend portions and the connecting terminals on the mounted component side. Further, if the fine gimbal portion is damaged in machining processing, the yield ratio of the flexure may fall. Still further, if new machining processing which has never existed before is added, a new process and a new investment in the equipment for the process will be required.

BRIEF SUMMARY OF THE INVENTION

An object of the present invention is to provide a flexure of a hard disk drive which achieves excellent mounting density or connection reliability without machine processing.

According to one embodiment, a flexure is used for a hard disk drive and comprises a metal base including a metal plate and a conductive member formed on the metal base. The conductive member comprises an insulating layer formed on the metal base and a conductive layer formed on the insulating layer. The insulating layer has a flat portion parallel to the metal base and an elevated portion projected from the flat portion. The elevated portion has an upper surface parallel to the metal base and side surfaces connecting the upper surface and the flat portion. The conductive layer has a connecting terminal formed along the side surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate current preferred embodiments of the invention, and together with the general description given above and the detailed description of the preferred embodiments given below, serve to explain the principles of the invention.

FIG. 5 is a sectional view showing another example of the connecting terminal.

FIG. 6 is a sectional view showing another example of the connecting terminal.

FIG. 11 is a plan view showing the fifth embodiment.

FIG. 12 is a plan view showing the sixth embodiment.

FIG. 13 is a plan view showing the seventh embodiment.

FIG. 14 is a sectional view showing the eighth embodiment.

DETAILED DESCRIPTION OF THE INVENTION

Figure 1:
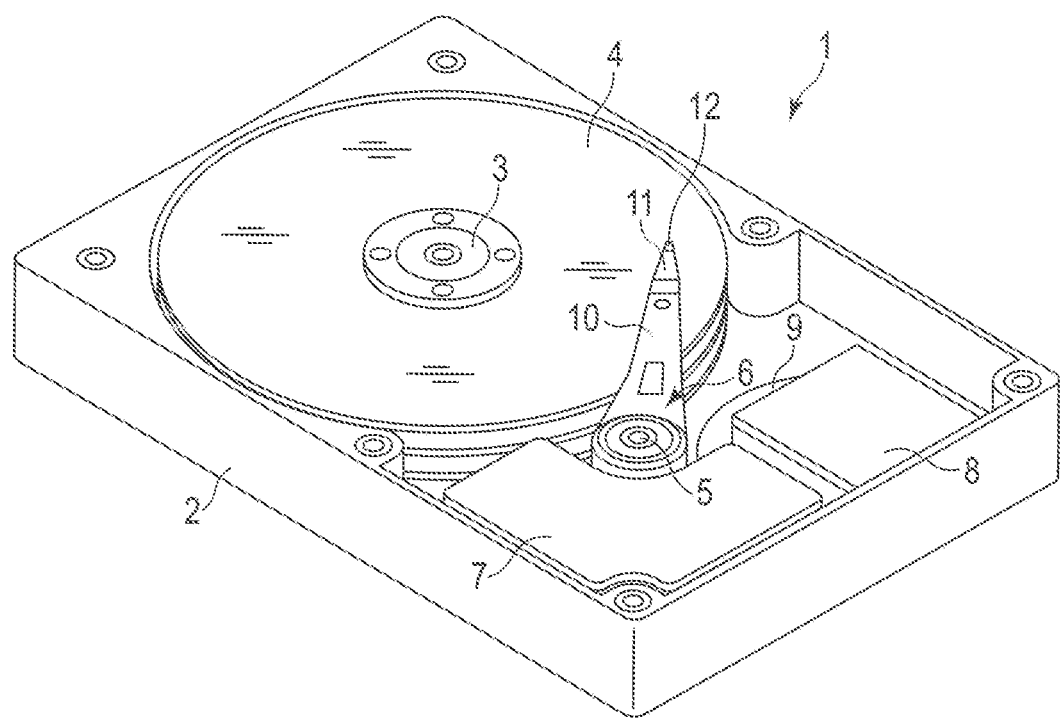
FIG. 1 is a perspective view showing an example of a hard disk drive.

Each of the embodiments of the present invention relates to a flexure 15 in which a connecting terminal 22 is formed on a side surface 24B of an elevated portion 24 and the area of the connecting terminal 22 in a plan view is thereby reduced. As the connecting terminal 22, which has been arranged two-dimensionally, is arranged three-dimensionally, enough space can be secured. As a result, connection reliability can be improved by increasing the distance between the connecting terminals 22.

According to the flexure 15, even if the number of the connecting terminals 22 is increased and the mounting density of the mounted components is increased, a sufficient distance can be ensured between the connecting terminals 22, and therefore both high mounting density and high connection reliability can be realized. Since this is implementable simply by changing the mask pattern of the conductive member, no new process such as machine processing or no new investment in the equipment for the process will be required. Damage from machining processing can be prevented in advance. Therefore, the commercial value of the flexure can be improved, and the increase in the manufacturing cost can be minimized.

The elevated portion 24 is not formed by machine processing such as bending a metal base 18 but can be formed by changing the mask pattern of an insulating layer 30. For example, the elevated portion 24 may be formed by stacking a first cover insulating layer 32 using a tail portion 16 of the flexure 15. It is possible to remove a base insulating layer 31 of a flat portion 23 while leaving the elevated portion 24 by halftone processing, etc. The flexure of each of the embodiments will be described hereinafter with reference to FIGS. 1 to 14.

FIG. 1 a perspective view showing an example of a hard disk drive. As shown in FIG. 1, a hard disk drive (HDD) 1 comprises a case 2, a disk 4 rotatable about a spindle 3, a carriage 6 pivotable about; a pivot axis 5, a voice coil motor 7 which drives the carriage 6, a controller 8 connected to an external device outside the case 2, and the like. The case 2 is closed with a lid which is not shown in the drawing. The carriage 6 and the controller 8 are connected to each other via a flexible substrate 9.

An arm 10 is provided in the carriage 6. A suspension 11 is attached to the distal end portion of the arm 10. A slider 12 constituting a magnetic head is mounted on the distal end portion of the suspension 11. When the disk 4 rotates at high speed, air blows between the disk 4 and the slider 12, and an air bearing is thereby formed. When the carriage 6 is turned by the voice coil motor 7, the suspension 11 moves in the radial direction of the disk 4, and the slider 12 thereby moves to a desired track of the disk 4.

Figure 2:
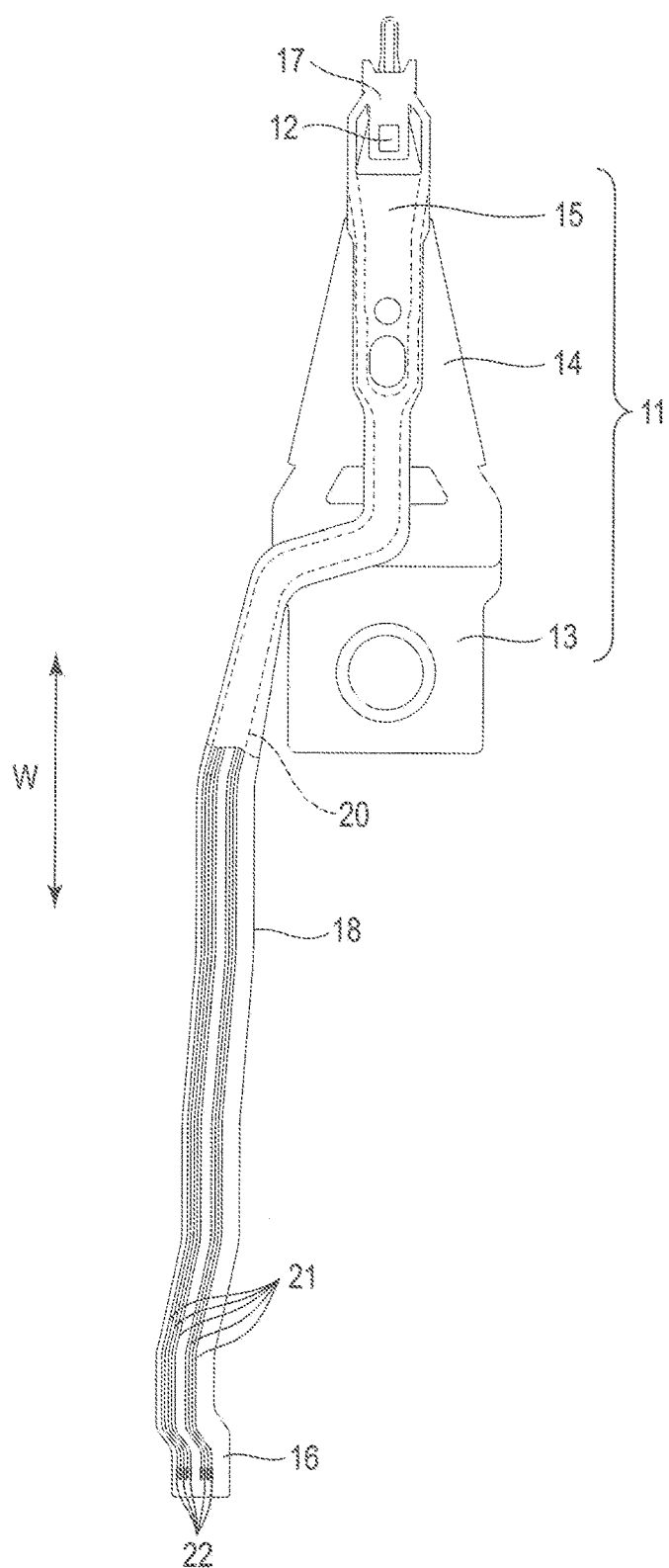
FIG. 2 is a plan view showing an example of a suspension viewed from a slider side.

FIG. 2 is a plan view showing the suspension 11 viewed from the slider 12 side. As shown in FIG. 2, the suspension 11 comprises a base plate 13 fixed to the arm 10 of the carriage 6, a load beam 14, and a flexure 15 with conductors. The direction indicated by an arrow W in FIG. 2 is the longitudinal direction of the flexure 15.

The flexure 15 is arranged along the arm 10 and the load beam 14, and a tail portion 16 is provided in the proximal end portion and a gimbal portion 17 is provided in the distal end portion. The tail portion 16 is connected to the flexible substrate 9 near the pivot axis 5. The slider 12 is mounted on the gimbal portion 17. The slider 12 and the suspension 11 constitute a head gimbal assembly.

Not only the slider 12 but also various components such as a microactuator and a laser diode may be mounted on the gimbal portion 17. For example, the microactuator is used for a dual-stage actuator and finely rotates the slider 12 in the sway direction. For example, the laser diode is used for a thermal assist method, and when information is to be recorded on the disk 4, the laser diode heats the disk 4 and temporarily reduces the retention force of magnetic particles. A microwave device, etc., may be mounted instead of the laser diode.

The flexure 15 comprises a metal base 18 and a conductive member 20 formed on the metal base 18. The metal base 18 is formed of, for example, a metal plate such as a thin stainless steel plate and is fixed to the load beam 14. The conductive member 20 (conductive line member) comprises a plurality of conductors 21 (conductive line) which electrically connect the components mounted on the gimbal portion 17 and the tail portion 16. Connecting terminals 22 are formed at both ends of the conductors 21.

Figure 3:
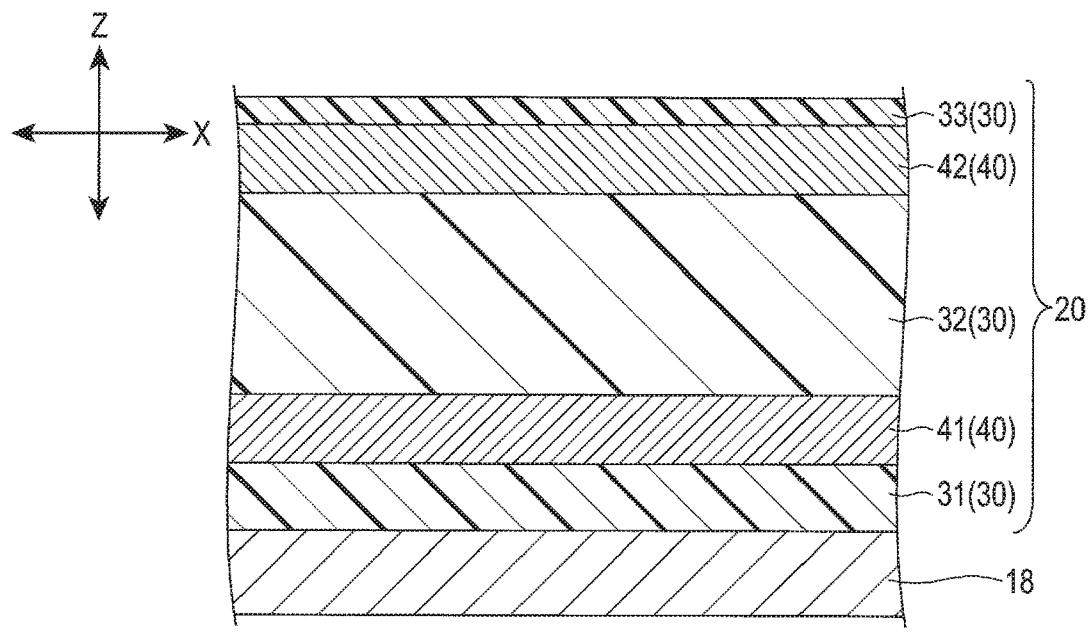
FIG. 3 is a sectional view showing an example of a conductive member.

FIG. 3 is a sectional view showing an example of the conductive member 20. The direction indicated by an arrow 1 in FIG. 3 is the thickness direction of the conductive member 20. The conductive member 20 comprises an insulating layer 30 formed on the metal base 18 and a conductive layer 40 formed on the insulating layer 30. In the example shown in FIG. 3, the insulating layer 30 includes a base insulating layer 31, a first cover insulating layer 32 and a second cover insulating layer 33. The conductive layer 40 includes a first conductive layer 41 and a second conductive layer 42.

The base insulating layer 31 is formed on the metal base 18. The first conductive layer 41 is formed on the base insulating layer 31. The first cover insulating layer 32 is formed on the base insulating layer 31 and covers the first conductive layer 41. The second conductive layer 42 is formed on the first cover insulating layer 32. The second cover insulating layer 33 is formed on the first cover insulating layer 32 and covers the second conductive layer 42.

The conductive layer 40 is formed of, for example, a metal material such as copper, and constitutes the above-described conductor 21 and connecting terminal 22. The thickness of the first and second conductive layers 41 and 42 is, for example, 9 μm (4 to 16 μm). The insulating layer 30 is formed of, for example, an electrically insulating material such as polyimide. The thickness of the base insulating layer 31 and the first cover insulating layer 32 is, for example, 10 μm (5 to 30 μm), and the thickness of the second cover insulating layer 33 is, for example, 5 μm (2 to 10 μm). The thickness of each of the layers included in the insulating layer 30 can be adjusted portion by portion, by multitone processing such as halftone processing.

Figure 4:
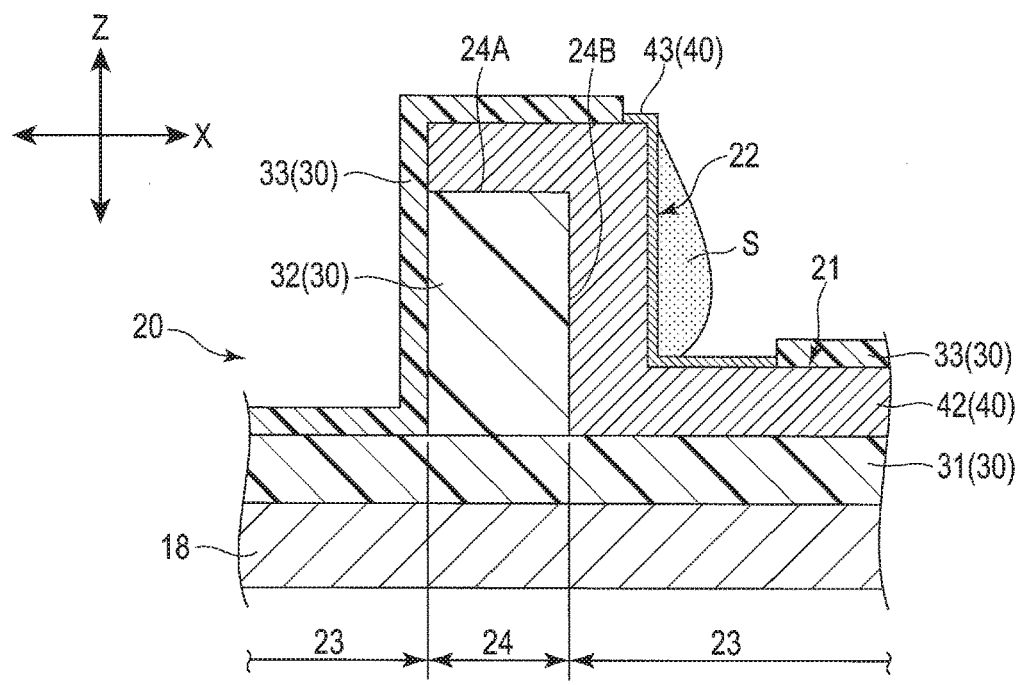
FIG. 4 is a sectional view showing an example of a connecting terminal.
Figure 7:
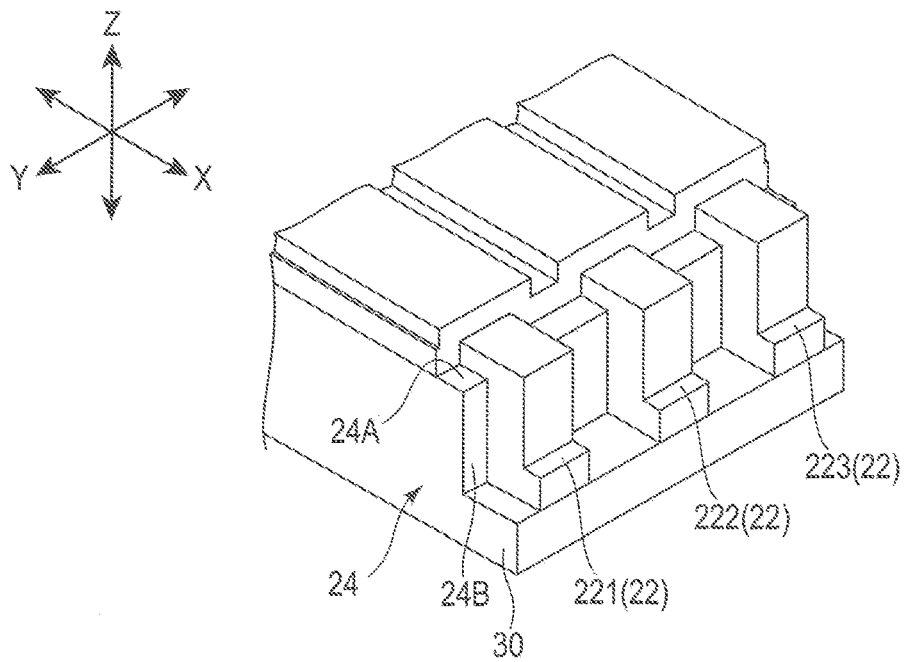
FIG. 7 is a perspective view showing the first embodiment.
Figure 8:
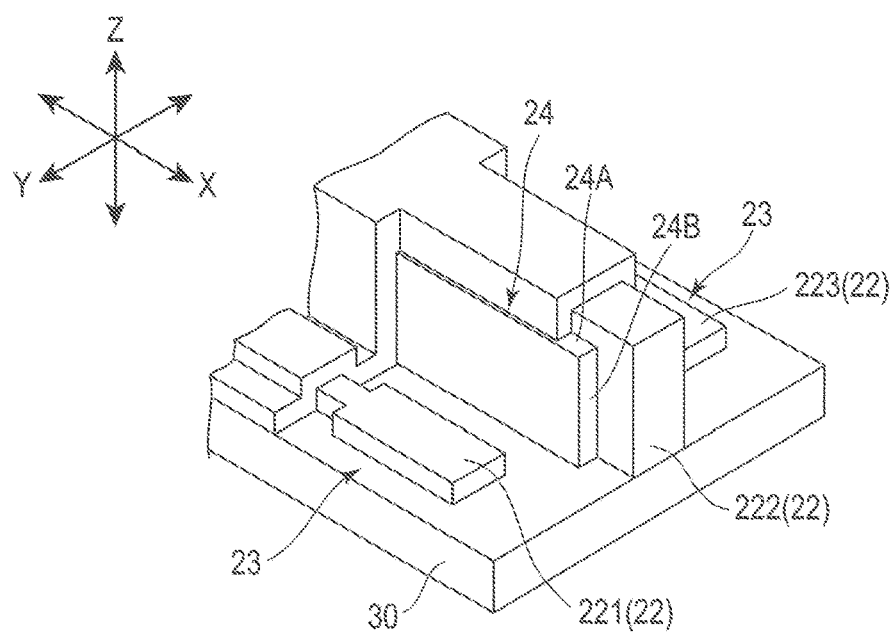
FIG. 8 is a perspective view showing the second embodiment.

FIG. 4 is a sectional view showing an example of the connecting terminal 22. One feature of the connecting terminal 22 according to the present invention is that the connecting terminal 22 is formed on a side surface 24B of an elevated portion 24. The elevated portion 24 may be referred to as a protrusion or a projection. The connecting terminal 22 formed on the elevated portion 24 and the side surface 24B thereof can be freely formed in any portion but is particularly preferable in the gimbal portion 17 and the tail portion 16 which have limited spaces.

As shown in FIG. 4, the insulating layer 30 has the flat portion 23 parallel to the metal base 18, and the elevated portion 24 elevated. (or projected) from the flat portion 23. In the example shown in FIG. 4, the flat portion 23 does not comprise the first cover insulating layer 32 but the elevated portion 24 comprises the first cover insulating layer 32.

The elevated portion 24 has an upper surface 24A which is parallel to the metal base 18, and side surfaces 24B which connect the upper surface 24A and the flat portion 23. The connecting terminal 22 formed of the second conductive layer 42 is formed on the side surface 24B. The connecting terminal 22 extends in the thickness direction Z along the side surface 24B. The connecting terminal 22 is covered with a plated layer 43 formed of metal which is resistant to corrosion such as nickel or gold.

FIG. 5 is a sectional view showing another example of the connecting terminal 22. In the example shown in FIG. 5, the cover insulating layer (the first and second cover insulating layers 32 and 33) is a single layer, the conductive layer 40 (the first and second conductive layers 41 and 42) is a single layer, and the first cover insulating layer 32 is not stacked on the elevated portion 24. The flat portion 23 and the elevated portion 24 are formed of the same base insulating layer 31. For example, the elevated portion 24 may be formed by reducing the thickness of the base insulating layer 31 in such a manner as to leave the elevated portion 24 by halftone processing, but not limited to this example.

FIG. 6 is a sectional view showing another example of the connecting terminal 22. In the examples shown in FIGS. 4 and 5, the connecting terminal 22 is formed on the side surface 24B located on a side on which the conductor 21 extends, that is, on a side which approaches the other end of the conductor 21. In the example shown in FIG. 6, the connecting terminal 22 is formed on the side surface 24B located on a side opposite to the side on which the conductor 21 extends, that is, on a side which recedes from the other end of the conductor 21. As shown in FIGS. 4 to 6, the connecting terminal 22 can be formed on any of the side surfaces 24B regardless of the extension direction X of the conductor 21.

Next, the first to eighth embodiments in which a plurality of connecting terminals 22 are arranged will be described with reference to FIGS. 7 to 14. In each of the embodiments, constituent elements having the same or similar functions as those of already-described embodiments will be denoted by the same reference numbers, and detailed description thereof may be omitted.

FIGS. 7 to 10 are perspective views showing the first to fourth embodiments. As in the first embodiment shown in FIG. 7, a plurality of connecting terminals 221, 222 and 223 may be formed on the side surface 24B of the elevated portion 24. As in the second embodiment shown in FIG. 8, the connecting terminal 222 may be formed on the side surface 24B of the elevated portion 24, and the connecting terminals 221 and 223 may be formed on the flat portion 23.

Figure 9:
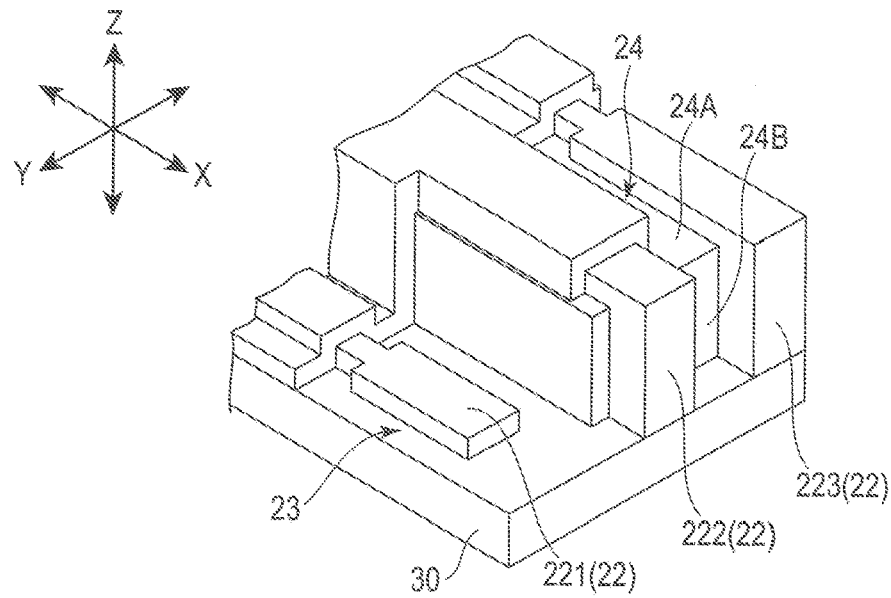
FIG. 9 is a perspective view showing the third embodiment.
Figure 10:
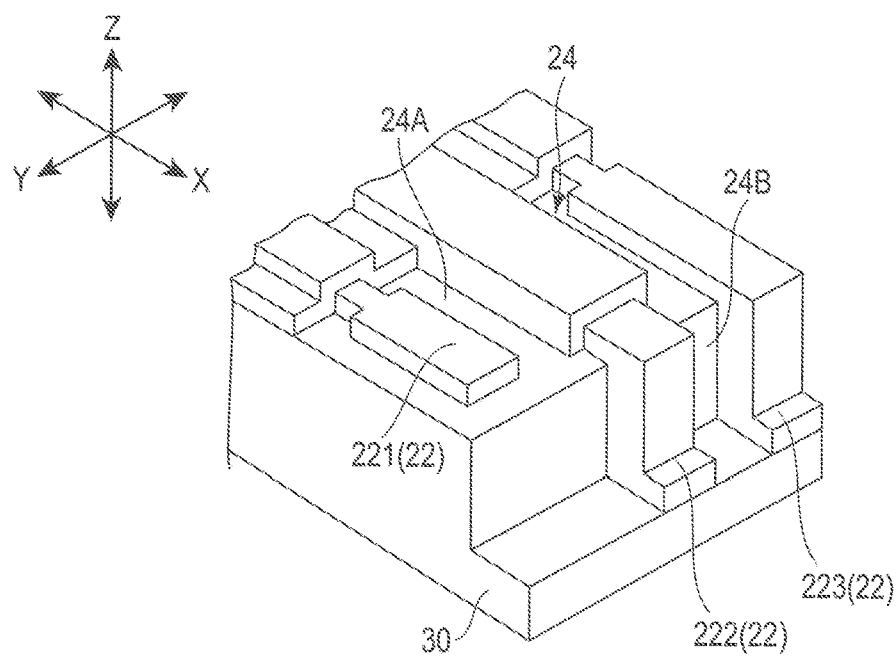
FIG. 10 is a perspective view showing the fourth embodiment.

As shown in FIGS. 9 and 10, the connecting terminal 223 may be formed continuously on the upper surface 24A and the side surface 243. Here, besides the connecting terminal 223, the connecting terminal 221 may be formed on the flat portion 23 as in the third embodiment shown in FIG. 9 or the connecting terminal 221 may be formed on the upper surface 24A of the elevated portion 24 as in the fourth embodiment shown in FIG. 10.

FIG. 11 is a plan view showing the fifth embodiment, and for the sake of explanation, the cover insulating layer is omitted and the conductors 21 are exposed. In FIG. 11, the direction indicated by an arrow X is the extension direction of the conductive member 20, and the direction indicated by an arrow Y is the width direction of the conductive member 20. The extension direction X, the width direction Y and the thickness direction shown in FIG. 3 are orthogonal to each other.

The extension direction X does not necessarily coincide with the longitudinal direction W of the flexure 15 because the conductive member 20 may be curved in the gimbal portion 17 and the tail portion 16 in some cases. The extension direction X includes a first direction X1 and a second direction X2 opposite to the first direction X1. The first direction X1 is, for example, a direction to the proximal end of the conductor 21 which leads to the tail portion 16, and the second direction X2 is, for example, a direction to the distal end of conductor 21 which leads to the gimbal portion 17.

In the fifth embodiment, the conductive member 20 has a plurality of elevated portions 24 (for example, first to third elevated portions 241, 242 and 243). The first to third elevated portions 241, 242 and 243 are arranged in a zigzag. In other words, the first elevated portion 241 and the third elevated portion 243 are arranged in the width direction Y. The second elevated portion 242 is located between the first elevated portion 241 and the third elevated portion 243, and is displaced from the first and third elevated portions 241 and 243 in the second direction X2.

For example, the connecting terminals 22 (221 and 223) formed on the first and third elevated portions 241 and 243 are formed on the side surface 24B on the first direction X1 side. Further, the connecting terminal 22 (222) formed on the second elevated portion 242 is formed on the side surface 24B on the second direction X2 side. The connecting terminals 22 formed on the flat portion 23 are shown by rising diagonal lines in FIG. 11. According to the fifth embodiment, the area of the connecting terminals 22 in a plan view can be reduced as compared to that of a case where the connecting terminals 22 are formed on the flat portion 23.

In the first and third elevated portions 241 and 243, the connecting terminals 22 (221 and 223) are formed on the side surfaces 24B on the first direction X1 side opposite to that of the adjacent second elevated portion 242. In the second elevated portion 242, the connecting terminal 22 (222) is formed on the second direction X2 side opposite to that of the adjacent first and third elevated portions 241 and 243. Therefore, according to the fifth embodiment, a distance D5 between the adjacent connecting terminals 22 can be increased as compared to that of a case where the connecting terminals 22 are formed on the flat portion 23. The distance D5 between the connecting terminals 22 formed on the side surfaces 24B is greater than a distance D0 between the connecting terminals 22 formed on the flat portion 23.

As in the sixth embodiment shown in FIG. 12, the connecting terminals 221 and 223 of the first and third elevated portions 241 and 243 may be formed on the side surfaces 24B on the same side as the adjacent second elevated portion 242 (the second direction X2 side), and the connecting terminal 222 of the second elevated portion 242 may be formed on the side surface 24B on the same side as the adjacent first and third elevated portions 241 and 243 (the first direction X1 side). According to the sixth embodiment, the area of the connecting terminals 22 in a plan view can be further reduced.

In the seventh embodiment shown in FIG. 13, the first and fourth elevated portions 241 and 244 are arranged in the extension direction X. The fourth elevated portion 244 is located on the second direction X2 side of the first elevated portion 241. The connecting terminal 22 (221) of the first elevated portion 241 is formed on the side opposite to the fourth elevated portion 244 (the first direction X1 side). The connecting terminal 22 (224) of the fourth elevated portion 244 is formed on the side opposite to the first elevated portion 241 (the second direction X2 side).

With respect to the second and third elevated portions 242 and 243, elevated portions 24 may be arranged, respectively, in the extension direction X. Further, with respect to these elevated portions 24, similarly to the second and third elevated portions 242 and 243, connecting terminals 22 may be arranged, respectively. According to the seventh embodiment, a plurality of connecting terminals 22 (221 and 224) can be arranged within an area similar to that of a case where a connecting terminal 22 is formed on the flat portion 23.

FIG. 14 is a sectional view showing the eighth embodiment. The eighth embodiment differs from the first to seventh embodiments in that the connecting terminals 22 are not formed on the side surfaces 24B but are formed on the upper surfaces 24A. A plurality of elevated portions 24 are arranged side by side and spaced apart from each other in the width direction Y of the conductive member 20. The flat portion 23 which is recessed from the upper surfaces of the elevated portions 24 is formed in the gap between the adjacent elevated portions 24. When the connecting terminals 22 are formed on the upper surfaces 24A of the elevated portions 24 and the level of the connecting terminals 22 is thereby raised, extra solder S can be absorbed to the side surfaces 24B. Therefore, as compared to a case where the connecting terminals 22 are provided without a level difference, short circuit between the adjacent connecting terminals 22 can be prevented.

In the flexure 15 of each of the above-described embodiments, the connecting terminals 22 are formed on the side surfaces 24B or upper surfaces 24A of the elevated portions 24. As the connecting terminals 22, which have been arranged two-dimensionally, are arranged three-dimensionally, enough space can be secured. Therefore, the distance between the connecting terminals 22 can be increased and connection reliability can be thereby improved. Even if the number of the connecting terminals 22 is increased and the mounting density of the mounted components is thereby increased, the connecting terminals 22 can be sufficiently spaced apart from each other, and therefore both high mounting density and high connection reliability can be realized.

Further, the structure of each of the embodiments can be implemented simply by changing the mask pattern of the conductive member 20, and therefore no new process such as machine processing or no new investment in the equipment for the process will be required. Accordingly, damage from machine processing can be prevented in advance. Therefore, the commodity value of the flexure 15 can be improved, and the increase in the manufacturing cost can be minimized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, in the example shown in FIG. 4, to increase the space of the side surface 24B for forming the connecting terminal 22, not only is the first cover insulating layer 32 stacked on the elevated portion 24, but also the base insulating layer 31 of the flat portion 23 may be removed or reduced in thickness. Accordingly, the level difference between the flat portion 23 and the upper surface 24A can be further increased.

What is claimed is:

1. A flexure of a hard disk drive comprising:
a metal base including a metal plate; and
a conductive member formed on the metal base, wherein:
the conductive member comprises an insulating layer formed on the metal base and a conductive layer formed on the insulating layer,
the insulating layer has a flat portion parallel to the metal base and an elevated portion projected from the flat portion,
the elevated portion has an upper surface parallel to the metal base and a side surface connecting the upper surface and the flat portion,
the conductive layer has a connecting terminal formed along the side surface,
the connecting terminal is covered with a plated layer formed of metal, and
the plated layer is opposed to the side surface via the connecting terminal.

2. The flexure of claim 1, comprising a first said elevated portion, a second said elevated portion, and a third said elevated portion,
wherein:
an extension direction of the conductive member includes a first direction and a second direction opposite to the first direction,
the first elevated portion and the third elevated portion are arranged in a width direction intersecting the extension direction,
the second elevated portion is located between the first elevated portion and the third elevated portion in the width direction and is located on a second direction side with respect to the first elevated portion and the third elevated portion in the extension direction,
the connecting terminals of the first elevated portion and the third elevated portion are formed respectively on the side surfaces of the first elevated portion and the third elevated portion on a first direction side, and
the connecting terminal of the second elevated portion is formed on the side surface of the second elevated portion on the second direction side.

3. The flexure of claim 1, comprising a first said elevated portion, a second said elevated portion, and a third said elevated portion,
wherein:
an extension direction of the conductive member includes a first direction and a second direction opposite to the first direction,
the first elevated portion and the third elevated portion are arranged in a width direction intersecting the extension direction,
the second elevated portion is located between the first elevated portion and the third elevated portion in the width direction and is located on a second direction side with respect to the first elevated portion and the third elevated portion in the extension direction,
the connecting terminals of the first elevated portion and the third elevated portion are formed respectively on the side surfaces of the first elevated portion and the third elevated portion on the second direction side, and
the connecting terminal of the second elevated portion is formed on the side surface of the second elevated portion on a first direction side.

4. The flexure of claim 1, comprising a first said elevated portion and a fourth said elevated portion arranged in an extension direction of the conductive member,
wherein:
the extension direction includes a first direction and a second direction opposite to the first direction,
the fourth elevated portion is located on a second direction side with respect to the first elevated portion, the connecting terminal of the first elevated portion is formed on the side surface of the first elevated portion on a first direction side, and the connecting terminal of the fourth elevated portion is formed on the side surface of the fourth elevated portion on the second direction side.

5. The flexure of claim 1, wherein:

the insulating layer includes a base insulating layer formed on the metal base, a first cover insulating layer formed on the base insulating layer, and a second cover insulating layer formed on the first cover insulating layer, the first cover insulating layer is not stacked on the flat portion, and the first cover insulating layer is stacked on the elevated portion.

6. A flexure of a hard disk drive comprising:

a metal base including a metal plate; and a conductive member formed on the metal base, wherein:

the conductive member comprises an insulating layer formed on the metal base and a conductive layer formed on the insulating layer, the insulating layer has a flat portion parallel to the metal base and a plurality of elevated portions projected from the flat portion, the elevated portions are arranged side by side and are spaced apart from each other, the conductive layer has a plurality of connecting terminals formed respectively on upper surfaces of the elevated portions, and a part of the flat portion is formed in a cap between two adjacent ones of the elevated portions.

7. The flexure of claim 6, wherein:

the insulating layer includes a base insulating layer formed on the metal base, a first cover insulating layer formed on the base insulating layer, and a second cover insulating layer formed on the first cover insulating layer, the first cover insulating layer is not stacked on the flat portion, and the first cover insulating layer is stacked on the elevated portions.

* * * * *